UNITED STATES PATENT OFFICE 3,018,183
Patented Jan. 23, 1962

3,018,183
MARSHMALLOW DRY MIX
Hubert A. Downey, 476 Sheridan Road, Evanston, Ill.
No Drawing. Filed Sept. 23, 1959, Ser. No. 841,674
1 Claim. (Cl. 99—134)

This invention relates to a food product and particularly to a novel marshmallow dry mix and method of preparation thereof.

Whereas the preparation of food compositions, of the type generally comprehended under the term marshmallow, viewed from a purely operational standpoint involves comparatively simple procedures, in actual practice it is found that established standards as to components, proportions and operating conditions must be adhered to rather closely in order to obtain an acceptable product. In large scale operation, even minor departures, which may be inadvertently introduced may produce results costly in terms of losses of entire batches; and attempts to provide means of producing marshmallow on a smaller scale, as in the home kitchen have met with very inconsiderable success. In plant manufacture hitherto it has been deemed necessary to employ skilled operators and expenditures of time and space requirements have been viewed as practically unavoidable. The conventional methods involve such steps as soaking, cooking, stirring, whipping, casting and setting, and the carrying out of the latter steps in special storage or curing rooms. Ordinarily the cast batch is permitted to set for a period of 8 to 10 hours. The proportions and temperatures involved in the several steps have required close attention and control.

It is an object of the present invention to provide a marshmallow mix in dry prepared form, properly selected and proportioned, wherewith, by following simple directions, the uniform product may be turned out, consistently and with minimum expenditure of time and labor.

A further object of the invention is the provision of a marshmallow product of good quality and dependable uniform characteristics.

Further objects and advantages will appear in the course of the following description.

In accordance with the present invention a dry marshmallow mix in finely divided form is prepared containing a major proportion of dextrose together with minor proportions of starch, gelatin, and phosphates, to which may further be added if desired a moisture retaining agent, and a vegetable gum. To obtain the marshmallow product it is merely necessary to add to the foregoing hot (boiling) water. The latter is incorporated with stirring after which the materials are whipped until the marshmallow will stand in peaks, after which the product is transferred to a container which has been dusted with powdered starch or sugar to prevent sticking. The thus formed marshmallow product then need only be permitted to stand and set for a short period of time at room temperature. If desired, a lower temperature may be used and this will have the effect of further reducing the time required for setting.

All of the components of the foregoing composition are readily obtainable on the market. Corn sugar and corn syrup constitute suitable sources of dextrose. The gelatin employed preferably is a type containing balanced amounts of pig gelatin and bone gelatin, and good results are obtained if these types of gelatin are present in approximately equal amounts. Pig gelatin normally is of a tough consistency and the inclusion therewith of bone gelatin is found to soften the pig gelatin to a desirable consistency. Moisture retaining agents suitable in the practice of the invention include sorbitol and glycerin. Good results have been obtained using a complex dehydrated sodium polyphosphate preparation available as Unadjusted Hexto-phosphate Calgon (Hogen Chemicals and Controls, Inc.). The flavoring material customarily added is vanilla, and for this purpose powdered vanillin of good commercial grade may be employed. Cream of tartar and salt may be added if desired. For the starch component preference is for a good grade of powdered cornstarch. The foregoing materials are well mixed in the form of a powdered product and packaged for the market.

Whereas the invention is particularly pointed out in the subjoined claim, in order that the invention may be readily understood and practiced by those skilled in the art reference now will be had to an example thereof:

*Dry marshmallow mix*

| | Lbs. |
|---|---|
| Gelatin, powdered (50–50 pig and bone) | 14 |
| Dextrose (corn sugar) | 73½ |
| Cornstarch | 10 |
| Phosphates (dehydrated polyphosphate complex) | ¼ |
| Sorbitol | ¼ |
| Vanillin, powdered | 2 |

After the foregoing ingredients have been incorporated into a homogeneous mix, the resulting product is packaged, ready for preparation of the marshmallow in edible form. This is achieved merely by adding hot boiling water, stirring, whipping and permitting the mixture to set. For example, to the contents of a package containing 1½ oz. of the dry mixture there may be added 4 oz. of boiling hot water immediately followed by stirring for two minutes. 6 oz. of ordinary table sugar then may be added and the total mixture whipped in a conventional kitchen electric food mixer from 5–7 minutes, gauged by the consistency. The whipped product is now placed in a flat metal pan which has been coated with shortening and dusted with confectioners sugar, and is permitted to stand at room temperature for about 2 hours.

If desired, the cornstarch component in the above formula may be replaced in whole or in part by a vegetable gum, such as gum arabic.

Optionally the pan containing the whipped product may be placed in a refrigerator for about 30 minutes. At the end of this time the material may be cut into the desired shapes. The amount of water in the finished product may vary from as low as 20% or less to 30% or higher.

What is claimed as my invention is:

A homogeneous dry marshmallow mix comprising, in finely divided form, approximately 73½ parts of corn sugar, about 14 parts of powdered gelatin, about 10 parts of cornstarch, about 2 parts of vanillin, about 0.25 part of sodium phosphates, and about 0.25 part of sorbitol, said gelatin being composed of pig gelatin and bone gelatin in approximately equal amounts, said parts being expressed in parts by weight.

References Cited in the file of this patent

UNITED STATES PATENTS

| 2,171,244 | Otterbacher | Aug. 29, 1939 |
| 2,399,195 | Bodenheim | Apr. 30, 1946 |
| 2,495,217 | Annarilli | Jan. 24, 1950 |
| 2,692,201 | Conrad et al. | Oct. 19, 1954 |

OTHER REFERENCES

"Sorbitol" by W. H. Childs, reprinted from The Manufacturing Confectioner, October 1945, pages 26 and 28.

"Candy Production: Methods and Formulas" by Richmond, The Manufacturing Confectioner, Chicago, Illinois, 1948, pages 345 and 367.